(12) United States Patent
Shyu

(10) Patent No.: US 6,298,068 B1
(45) Date of Patent: Oct. 2, 2001

(54) METHODS AND APPARATUS FOR ISDN COMMUNICATIONS WITH DUAL MODE ACCESS TO INTERFACE APPARATUS ON-BOARD MEMORY

(75) Inventor: Hann J. Shyu, Newport, RI (US)

(73) Assignee: Telco Systems, Inc., Norwood, MA (US)

( * ) Notice: Subject to any disclaimer, the term of this patent is extended or adjusted under 35 U.S.C. 154(b) by 0 days.

(21) Appl. No.: 09/387,112

(22) Filed: Aug. 31, 1999

(51) Int. Cl.[7] .............................. H04L 12/66; G06F 12/00
(52) U.S. Cl. ............................................. 370/463; 711/100
(58) Field of Search ..................................... 370/264, 323, 370/325, 359, 419, 440, 463, 524; 710/105; 711/108, 149–154, 100, 104–105, 111–112, 202–203; 712/32, 43, 34

(56) References Cited

U.S. PATENT DOCUMENTS

| | | | |
|---|---|---|---|
| 5,463,628 | 10/1995 | Sorensen | 370/467 |
| 5,495,485 | * 2/1996 | Hughes-Hartogs | 370/524 |
| 5,524,111 | 6/1996 | Le Pennec et al. | 370/465 |
| 5,560,031 | * 9/1996 | Vankan et al. | 711/149 |
| 5,740,173 | 4/1998 | Fiorini | 370/394 |
| 5,815,505 | 9/1998 | Mills | 370/463 |
| 5,822,383 | 10/1998 | Muntz et al. | 370/516 |
| 5,832,240 | * 11/1998 | Larsen et al. | 710/105 |
| 5,918,039 | * 6/1999 | Buswell et al. | 703/27 |
| 5,926,048 | 7/1999 | Greatwood | 327/160 |
| 5,926,647 | 7/1999 | Adams et al. | 712/36 |
| 6,058,452 | * 5/2000 | Rangasayee et al. | 711/108 |
| 6,072,794 | 6/2000 | Kang | 370/352 |

\* cited by examiner

*Primary Examiner*—Wellington Chin
*Assistant Examiner*—Maikhanh Tran
(74) *Attorney, Agent, or Firm*—David J. Powsner; Nutter, McClennen & Fish LLP

(57) ABSTRACT

Improved ISDN interface apparatus and methods permit dual mode access to an on-board memory. A first memory controller is provided that responds to addresses in a first address range to read, write or otherwise access data in an "on-board" memory a first memory access mode. A second memory controller is provided that responds to addresses in a second address range to access data in that memory in a second memory access mode. Multiplexing circuitry selectively applies control signals from the first or second memory controllers to the memory, thereby, causing it to read, write or otherwise access data according to the first or second modes. The aforementioned first and second modes can constitute differing memory access modes. Thus, for example, first mode is a single-beat memory access mode, according to one practice of the invention. The second mode can comprise, on the other hand, for example, a burst mode.

50 Claims, 2 Drawing Sheets

METHODS AND APPARATUS FOR ISDN COMMUNICATIONS WITH DUAL MODE ACCESS TO INTERFACE APPARATUS ON-BOARD MEMORY

BACKGROUND OF THE INVENTION

The present invention is directed to ISDN communications and, particularly, to methods and apparatus that facilitate access to the "on-board" memory of an network interface card (NIC) or other ISDN interface device.

Network interface cards, or NICs, provide an interface between ISDN lines and host processing equipment, such as, personal computers, videoconferencing equipment, telephony equipment, and the like. NICs receive data over the ISDN lines from other nodes (e.g., other teleconference participants), reformat it, and send it to the host, e.g., via a serial bus as an MVIP bus or an H100 bus. Likewise, NICs accept data from a host, repackage the data, and transmit it to the ISDN lines for transfer to other network nodes.

NICs typically have an on-board memory that is used to temporarily store data exchanged between the ISDN lines and the host. Thus, for example, receive data from the ISDN lines is written to the on-board memory prior to transfer to the host. Likewise, transmit data from the host is written to that memory prior to transfer out over the ISDN lines.

Access to the on-board memory is typically controlled by a communications processor within the NIC, i.e., an on-board communications processor. Some of the reformatting and repacking operations referred to above are performed by the communications processor directly on the data while it is stored in memory. Other operations are performed through joint action of communications processor and other components of the NIC, e.g., line transceivers. These joint operations require that the communications processor strobe address and control lines of the memory at appropriate times and in appropriate sequences to insure that data are transferred to and from desired locations in memory.

The memory control circuitry of a communications processor is usually separate and distinct from the basic instruction processing circuitry. In the case of processors such as Motorola MPC860, by way of non-limiting example, this facilitates control of the NIC's on-board memory by additional or "external" devices, notably, the host processing equipment. Depending on which device (e.g., the communications processor or the host) is mastering the bus during any given cycle, the memory control circuitry responds to that device for purposes of strobing reads or writes to/from memory.

A memory controller may permit different modes of memory access. The most common is "single beat" mode, wherein a single byte or word of data transferred to/from a specified location in memory per bus cycle. In a single-beat read transaction, for example, the bus master drives an address onto the system bus at the outset of the cycle. The memory controller applies that address to the memory, along with control signals that cause it (the memory) to transfer data from the addressed location to the bus. In a single-beat write transaction, the bus master drives an address, then data, onto the bus. The memory controller applies these to the memory, along with the requisite control signals, causing the data to be stored at the addressed location in memory.

Burst mode transactions are used to transfer larger blocks of data. In these transactions, the bus master need not drive an address onto the bus for each word to be written to, or read from, memory. Instead, the bus master specifies only a start address. A burst or continuous sequence of data follows, with the memory controller computing and supplying addresses directly to memory. In a burst mode read transaction, for example, the bus master drives an address onto the system bus. The memory controller applies that and a successive sequence of addresses to the memory, along with the requisite control signals to cause data to be read from memory onto the bus. In a burst mode write transaction, the bus master drives an address, then a successive series a data, onto the bus. The memory controller generates a successive series of addresses and applies them to the memory, causing the data to be stored at successive locations in memory.

Though not a feature of the Motorola MPC860, other memory controllers support still other modes of memory access, e.g., so-called "direct" memory access.

Notwithstanding the versatility of memory controllers, restrictions imposed by NIC (or other interface apparatus) architectures or by other factors may limit the modes with which they are called upon to access memory. Thus, for example, unless a host is coupled to a NIC via a bus that supports variable width cycles, the host cannot participate in a burst mode transaction. Such is the case of hosts that are coupled to NICs via the so-called ISA ("industry standard architecture") bus, which does not permit variable width "cycles" and which requires that addressing information be applied to the bus during each cycle.

While it is always desirable to access memory in the most efficient manner possible, one prior art solution has been to apply a "least common denominator" approach to NIC memory access. Thus, if architectural or other limitations limit the host to accessing the NIC memory single-beat mode, the NIC memory controller is configured to limit all devices (including the on-board processor) to that mode of access. While this has the advantage of simplicity, it can adversely impact NIC performance.

An object, therefor, of this invention is to provide improved methods and apparatus for ISDN communications and, more particularly, for accessing memory in NICs and other ISDN interface devices.

A further object is to provide such methods and apparatus as can be implemented with existing components and without undue manufacturing expense.

A further object is to provide such apparatus and methods that operate robustly and with minimal power consumption.

SUMMARY OF THE INVENTION

The foregoing are among the objects attained by the invention which provides, in one aspect, an improved NIC or other ISDN interface apparatus that permits dual mode access to an on-board memory. The apparatus includes a first memory controller that responds to addresses in a first address range to read, write or otherwise access data in the apparatus' on-board memory. A second memory controller responds to addresses in a second address range to access data in that memory. The first controller accesses the memory in first mode, e.g., single-beat mode. The second controller accesses the memory in a second mode, e.g., burst mode. Multiplexing circuitry selectively applies control signals from the first or second memory controllers to the memory.

In further aspects, the invention provides apparatus as described above in which an on-board digital data processor generates memory access requests that have addresses which are in the first address range. That digital data processor can be, for example, an on-board communications processor that is coupled to the on-board memory via the interface apparatus' system bus.

The interface apparatus can include, according to further aspects of the invention, addressing circuitry that modifies addresses generated by the host to place them in the second address range. That circuitry can, for example, modify high-order bits of host-generated addresses so as to differentiate them from on board processor-generated addresses.

Still further aspects of the invention provide interface apparatus as described above that include a host device bus (such as an ISA bus) through which the host is coupled to the apparatus' system bus. A plurality of addressing lines of the host device bus, more particularly, can be coupled to corresponding lines of the system bus. One or more additional addressing lines of the host device bus can be coupled to the memory controllers, but not to the memory. The addressing circuitry can modify addressing information on those additional lines, e.g., to differentiate them from address generated by the interface apparatus' on-board communications processor.

Still further aspects of the invention provide methods for operating a network interface card or other ISDN apparatus in accord with the foregoing.

Apparatus and methods according to the invention have a number of advantages over the prior art. They permit, for example, a host device and an on-board communications processor to access a common on-board memory in different modes. The memory controllers permit the on-board processor, for example, to access that memory in burst mode, while permitting the host to access the memory in single-beat mode. In those aspects of the invention that incorporate addressing circuitry as described above, these apparatus and methods also permit the on-board processor and host to access like memory locations using like addresses—i.e., without memory mapping.

These and other aspects of the invention are evident in the drawings and in the detailed description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
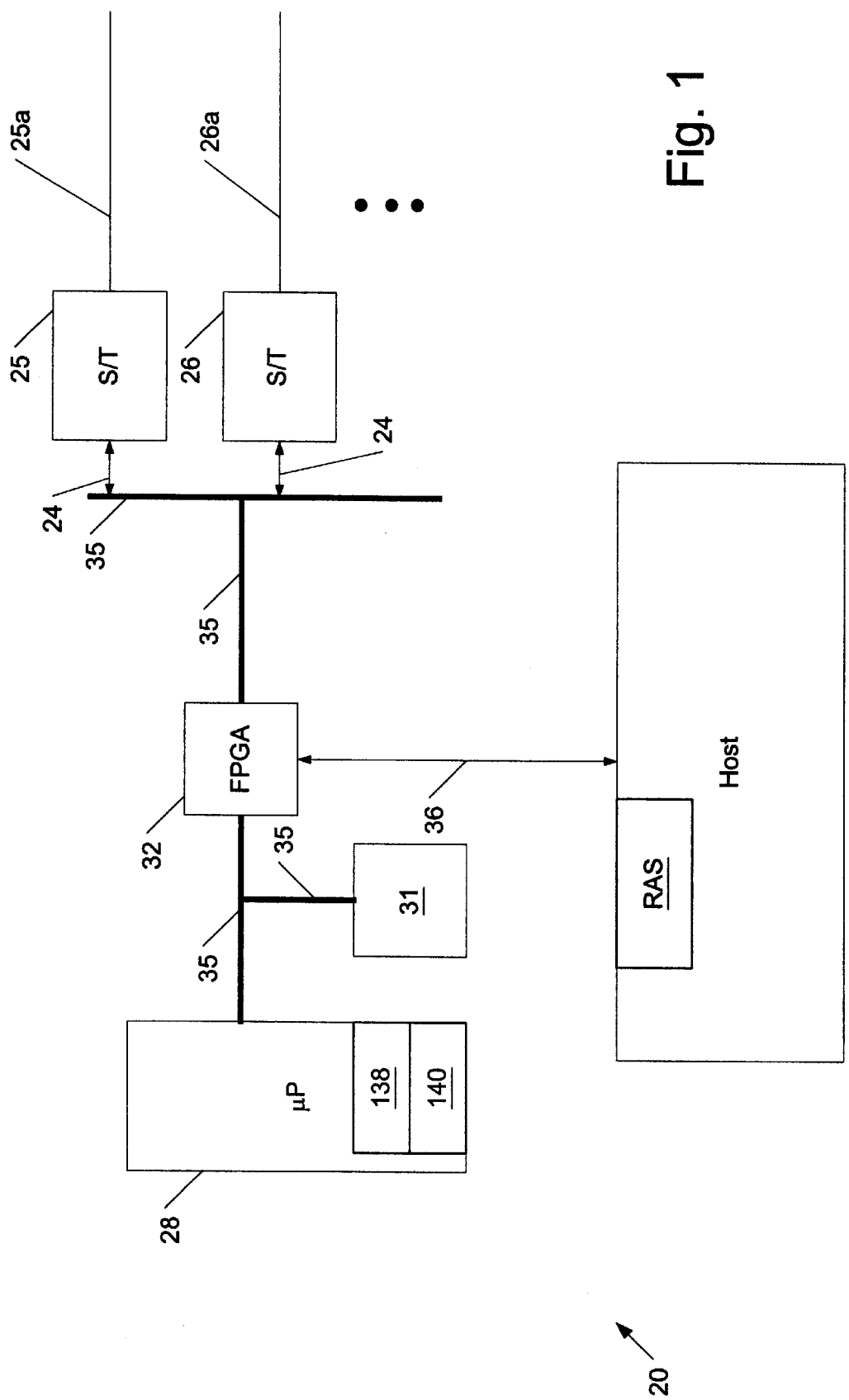
FIG. 1 depicts an ISDN network interface apparatus in accord with the invention.

FIG. 1 depicts an interface apparatus 10, according to one practice of the invention, that facilitates dual mode access to an on-board memory by a "off-board" host and by an on-board communications processor. Referring to the drawing, the apparatus 10 interfaces multiple ISDN lines 12, 14, e.g., T1 and/or E1 lines via transceivers 18, 20, in the conventional manner of the art. Though two ISDN lines are shown, it will be appreciated that the apparatus 10 may interface fewer or more lines. The illustrated transceivers are of the type commercially available in the marketplace for interfacing ISDN networks.

A switching and routing device 24 is used to route data and control signals between the transceivers 18, 20 and a system bus 26, to which other elements of the interface apparatus 10 are connected. The system bus may be a time-divisional multiplexed bus (e.g., an IDL bus) or any other bus suitable for address, data, and control signal transfer within an ISDN interface device.

In addition to the illustrated transceivers, bus 26 is coupled to a communications processor 30, a host bus 32 for host device 34, and an on-board memory 36, all of which are constructed and operated in the conventional manner known in the art. Thus, by way of non-limiting example, memory 36 can comprise EDO DRAM or other conventional storage device. In alternate embodiments, system bus 26 is coupled to other elements of the interface apparatus 10, in addition to or in lieu of elements 28 and 30.

The switching and routing functions of device 24 can be provided, e.g., in the manner of time-variant multiplexors described in copending, commonly assigned U.S. patent application Ser. No. 09/313,500, filed May 17, 1999, for METHODS AND APPARATUS FOR ROUTING DATA WITHIN, AND EFFECTING SERIAL DATA TRANSFERS WITH, AN ISDN COMMUNICATIONS INTERFACE, the teachings of which are incorporated herein by reference.

Multiplexor device 24 can be implemented via a field programmable gate array ("FPGA"), andn it can be implemented in an application-specific integrated circuit ("ASIC"), or other logic device, as well. Device 24 can include addressing circuitry 35 that modifies addresses received on address lines of host bus 32.

Illustrated communications processor 30 comprises a Motorola® MPC860 microprocessor, although other processors may be used instead. The processor 30 facilitates call administration in the conventional manner known in the art. It can also oversee inverse multiplexing ("bonding") as described in copending, commonly assigned U.S. patent application Ser. No. 09/330,578, filed Jun. 11, 1999, for INVERSE MULTIPLEXING SYSTEM FOR ISDN COMMUNICATIONS, the teachings of which are incorporated herein by reference. Moreover, it can be utilized to provide parallel transfers to the host in the manner of copending, commonly assigned U.S. patent application Ser. No. 09/240,528, filed Jan. 29, 1999, for METHOD AND APPARATUS FOR EFFECTING PARALLEL DATA TRANSFERS BETWEEN A NETWORK INTERFACE CARD AND A HOST, the teachings of which are also incorporated herein by reference.

Illustrated communications processor 30 includes programmable memory controllers 38, 40, each capable of generating control signals for controlling an on-board memory. By way of example, the memory controllers of the aforementioned Motorola® MPC860 microprocessor are referred to as UPMs, or user-programmable machines. Other on-board memory controllers, whether integral to the communications processor 30 or separate and distinct therefrom, may be used to practice the invention in accord with the teachings herein.

Illustrated host 34 represents a personal computer, video conferencing equipment or other apparatus to which the apparatus 10 is coupled and for which it serves as an ISDN interface. In one prefered practice, the apparatus 10 comprises a daughter card or peripheral device interface card that "piggybacks" onto, or is otherwise coupled to, circuitry that comprises the host 34.

The host bus 32 includes any interface via which the host 34 transmits address, data and control signals to apparatus 10. This includes serial buses, such as MVIP or H100 buses, as well as parallel buses. In the illustrated embodiment host 34 comprises an ISA bus. As noted previously, a characteristic of such a bus is that it does not support variable width "cycles" and that it requires addressing information during each cycle.

A general understanding of the functions, structure and operation of interface apparatus 10 can be attained by reference to the aforementioned copending, commonly assigned applications, the teachings of which are incorporated by reference. A further understanding of the function, operation and cooperation of elements 35–40 in facilitating dual mode access to the on-board memory 36 by communications processor 30 and by host 34 (or other external masters) may be attained by reference to the discussion below.

Figure 2:
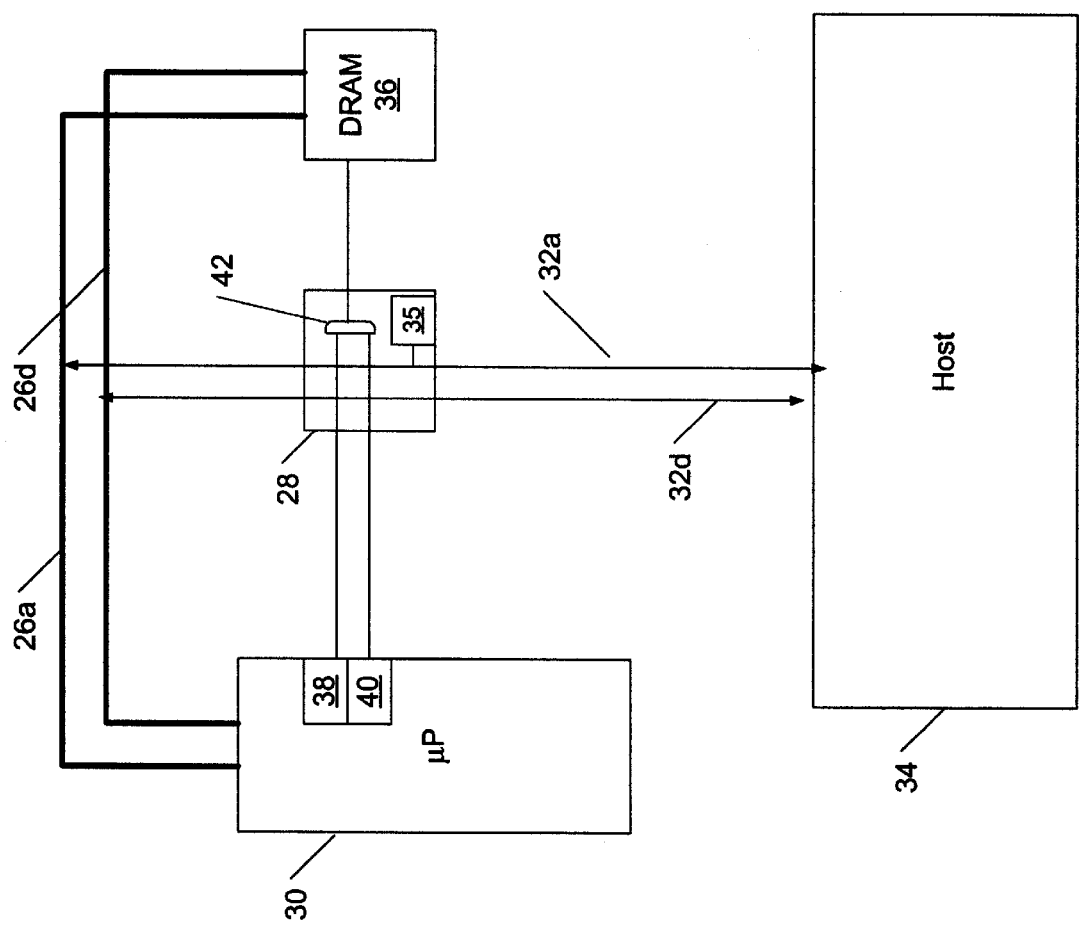
FIG. 2 depicts an arrangement of memory controllers, multiplexors and addressing circuitry in the ISDN network interface apparatus of FIG. 1.

FIG. 2 depicts components utilized to facilitate dual mode access to on-board memory 36 of interface apparatus 10 by communications processor 30 and host 34. It will be appreciated that these teachings may be applied in providing access to the memory 36 by other components in lieu, or instead. The same numbering convention is used for FIG. 2 as that for FIG. 1, discussed above. Finer granularity is depicted, however, with system bus 26 shown as including system address bus 26a and system data bus 26d. Likewise, host bus 32 is shown as including host address bus 32a and host data bus 32d.

As shown in the illustration, addressing lines of host address bus 32a are coupled to addressing lines of system address bus 26a. Likewise, data lines of host data bus 32d are coupled to addressing lines of system address bus 26d. Such coupling is preferably provided in switching and routing device 24, though, it may be provided elsewhere instead or in addition.

Multiplexor 42, which is shown in FIG. 1 but not described above, is depicted as forming part of switching and routing device 24, though those skilled in the art will appreciate that component 42 may be implemented separately from device 24, as well. As above, device 24 is shown as including addressing circuitry 35 that modifies addresses received on address lines of host bus 32. In the illustrated embodiment, the modification is effected by setting the highest-order address line of the system bus 26a.

Illustrated memory controller 38 (which can be, for example, UPMA of the aforementioned Motorola MPC860 communications processor) is configured to respond to addresses on system address bus 26a in a first address range (e.g., 00000000–0000FFFF) to generate signals for controlling a memory, such as DRAM 36. Those signals include chip select (CS), column address select (CAS), and other memory control signals conventional in the art and/or particular to the UPM of the aforementioned Motorola communications processor. Illustrated controller 38 is further configured to generate such control signals in a manner consistent with a burst memory access protocol.

Memory controller 40 (which can be, for example, UPMB of the aforementioned Motorola MPC860 communications processor) is likewise configured to respond to addresses on system address bus 26a in a second address range (e.g., 10000000–1000FFFF) to generate signals for controlling a memory, such as DRAM 36. Those signals can also include chip select (CS), column address select (CAS), and other memory control signals conventional in the art and/or particular to the UPM of the aforementioned Motorola communications processor. Illustrated controller 40 is further configured to generate such control signals in a manner consistent with a single-beat memory access protocol.

A further understanding of the specifics of configuring a memory controller of the Motorola MPC860 communications processor may be attained by reference to MPC860 PowerQUICC User's Manual, Motorola Document MPC860UM/AD, Rev. 1 (July 98) at pages 16–1, et seq., the teachings of which are incorporated herein by reference.

In a preferred embodiment, the address ranges to which the memory controllers 38, 40 respond are identical, except for the their highest order bits. The ranges suggested parenthetically above, of course, are merely examples of such ranges.

Addressing circuitry 35 monitors the system bus 26 to determine when it is controlled by host 34, e.g., following successful bus arbitration by that device. When so controlled, the circuitry sets the highest-order addressing line on the system address bus 26a and, optionally, on the host address bus 32a. By way of non-limiting example, if the host 34 applies an address 0000000E to the host address bus 32a, addressing circuitry 35 sets the high-order address line, effectively, converting that address to 1000000E.

These "converted" address appear—to the memory controllers 38, 40—to fall within the address range handled by controller 40. As a result, memory operations effected by them are handled using the memory access mode of controller 40, in this case, single-beat mode.

Conversely, whenever the communications processor 30 takes control of the system bus 26a, no high order bit is set. Accordingly, memory operations effected by them are handled using the memory access mode of controller 38, in this case, burst mode.

Multiplexor 42 multiplexes the memory control signals generated by memory controllers 38, 40 to memory 36, as illustrated. The control lines are selected depending on whether the communications processor 30 or the host 34 is mastering the system bus 26. Thus, if the communications processor 30 is mastering the bus, control lines from memory controller 38 are selected for application to memory 36. Otherwise, if the host 36 is mastering the bus 26, control lines from memory controller 40 are selected.

Described above are method and apparatus meeting the desired objects by affording dual mode access to the on-board memory of an ISDN interface device. Those skilled in the art will, of course, appreciate that the embodiments shown in the drawings and discussed above are merely examples and that other embodiments incorporating modifications thereto fall within the scope of the invention.

Thus, by way of non-limiting example, it will be appreciated that the communications processor 30 of the interface apparatus 10 can generate addresses within the "second" address range described above and, thereby, utilize the memory access modes provided by the controller 40.

By way of further non-limiting example, it will be appreciate that additional memory controllers can be utilized, e.g., to support additional external devices. It will be appreciated moreover, for example, that access modes other that single-beat and burst can be provided by the memory controllers.

In view of the foregoing, what I claim is:

1. An apparatus that provides an interface between an ISDN network and a host, the apparatus comprising:
    a memory that responds to an applied set of control signals to read or write data at an addressable location therein,
    a first memory controller that responds to addresses in a first address range by generating a first set of control signals to cause the memory to read or write data in a first mode,
    a second memory controller that responds to addresses in a second address range by generating a second set of control signals to cause the memory to read or write data in a second mode,
    multiplexing circuitry that is coupled to the first memory controller, the second memory controller and the memory and that applies at least a selected one of the first set of control signals and the second set of control signals to the memory.

2. An apparatus according to claim 1, wherein the first and second modes are memory access modes.

3. An apparatus according to claim 2, wherein the first mode is a single-beat memory access mode and the second mode is a burst memory access mode.

4. An apparatus according to claim 1, comprising
a first processor that generates addresses in the first address range,
addressing circuitry that is coupled to the host and that modifies addresses generated thereby the host so as to place those addresses in the second address range.

5. An apparatus according to claim 4, wherein the addressing circuitry modifies one or more selected bits in addresses generated by the host.

6. An apparatus according to claim 5, wherein the addressing circuitry modifies a high-order bit in an address generated by the host.

7. An apparatus according to claim 5, wherein the second memory controller is responsive to a high-order bit modified by the addressing circuitry but wherein the memory is not.

8. An apparatus according to claim 3, comprising
a system bus, and
a first processor that is coupled to the memory by way of the system bus,
a host bus that is coupled to the host and to the system bus.

9. An apparatus that provides an interface between an ISDN network and a host, the apparatus comprising:
a memory that responds to an applied set of control signals to read or write data at an address indicated on the system address bus,
a first memory controller responds to addresses in a first address range by generating a first set of control signals to cause the memory to read or write data in a first mode,
a second memory controller that responds to addresses in a second address range by generating a second set of control signals to cause the memory to read or write data in a second mode,
the multiplexing circuitry that is coupled to the first memory controller, the second memory controller and the memory and that applies at least a selected one of the first set of control signals and the second set of control signals to the memory,
a system address bus that is coupled to the memory and to the first and second memory controllers,
a host address bus that is coupled to the host and to the system address bus.

10. An apparatus according to claim 9, wherein the first and second modes are memory access modes.

11. An apparatus according to claim 10, wherein the first mode is a single-beat memory access mode and the second mode is a burst memory access mode.

12. An apparatus according to claim 9, comprising a first processor that generates addresses in the first address range and applies those addresses to the system address bus.

13. An apparatus according to claim 11, comprising addressing circuitry that is coupled to the host bus and that modifies addresses thereon to place them in the second address range.

14. An apparatus according to claim 13, wherein the host bus includes one or more selected address lines that are coupled to the first and second memory controllers via the system bus but that are not coupled to the memory via the system bus or otherwise.

15. An apparatus according to claim 14, wherein the addressing circuitry modifies addressing information on the one or more selected address lines.

16. An apparatus according to claim 15, wherein the one or more selected address lines carry one or more corresponding high-order address bits generated by the host.

17. An ISDN network interface card (NIC), comprising:
a communications processor and a memory that are coupled by way of at least a system bus,
the memory responding to an applied get of control signals to read or write data at an addressable location indicated by address lines of the system bus,
the communications processor including
a first memory controller that responds to addresses in a first address range by generating a first set of control signals to cause the memory to read or write data in a first mode, and
a second memory controller that responds to addresses in a second address range by generating a second set of control signals to cause the memory to read or write data in a second mode,
multiplexing circuitry that is coupled to the communications processor the memory and that applies at least a selected one of the first set of control signals and the second set of control signals to the memory.

18. A NIC according to claim 17, wherein the first and second modes are memory access modes.

19. A NIC according to claim 18, wherein the first mode is a single-beat memory access mode and the second mode is a burst memory access mode.

20. A NIC according to claim 17, wherein
the communications processor generates addresses in the first address range,
the NIC includes addressing circuitry that is coupled to the host bus and modifies addresses generated by a host to which the NIC is coupled, thereby, placing those addresses in the second address range.

21. A NIC according to claim 20, wherein the addressing circuitry modifies one or more selected bits in addresses generated by the host.

22. A NIC according to claim 21, wherein the addressing circuitry modifies a high-order bit in an address generated by the host.

23. A NIC according to claim 21, wherein the second memory controller is responsive to a high-order bit modified by the addressing circuitry but wherein the memory is not.

24. A NIC according to claim 19, comprising a host bus that is coupled to the host and to the system bus.

25. An ISDN network interface card (NIC), comprising:
a communications processor and a memory that are coupled by way of at least a system address bus,
the memory responding to an applied set of control signals to read or write data at an addressable location indicated by the system address bus,
the communications processor including:
a first memory controller that responds to addresses in a first address range by generating a first set of control signals to cause the memory to read or write data in a first mode, and
a second memory controller that responds to addresses in a second address range by generating a second set of control signals to cause the memory to read or write data in a second mode,
multiplexing circuitry that is coupled to the communications processor and to the memory and that applies at least a selected one of the first set of control signals and the second set of control signals to the memory, and a host address bus that is coupled to a host and to the system address bus.

26. A NIC according to claim 25, wherein the first and second modes are memory access modes.

27. A NIC according to claim 26, wherein the first mode is a single-beat memory access mode and the second mode is a burst memory access mode.

28. A NIC according to claim 25, wherein the communications processor generates addresses in the first address range and applies those addresses to the system address bus.

29. A NIC according to claim 27, comprising addressing circuitry that is coupled to the host bus and that modifies addresses thereon to place them in the second address range.

30. A NIC according to claim 29, wherein the host bus includes one or more selected address lines that are coupled to the second memory controller via the system bus but that are not coupled to the memory via the system bus or otherwise.

31. A NIC according to claim 30, wherein the addressing circuitry modifies addressing information on the one or more selected address lines.

32. A NIC according to claim 31, wherein the one or more selected address lines carry one or more corresponding high-order address bits generated by the host.

33. An interface method between an ISDN network and a host, the method comprising:

A. responding to addresses in a first address range by generating a first set of control signals to cause a memory to read or write data in a first mode, B. responding, with a second memory controller, to addresses in a second address range by generating a second set of control signals to cause the memory to read or write data in a second mode, C. selectively applying the first or second sets of control signals to the memory.

34. A NIC according to claim 33, wherein the first and second modes are memory access modes.

35. A NIC according to claim 33, wherein the first mode is a single-beat memory access mode and the second mode is a burst memory access mode.

36. A method according to claim 33, including the steps of executing step (A) using a first memory controller, and executing step (B) using a second memory controller.

37. A method according to claim 36, wherein the first memory controller, the second memory controller and the memory are disposed in an interface apparatus, and wherein the method comprises the steps of generating addresses in the first range with a processor disposed within the interface apparatus, generating addresses in the second range from requests by the host.

38. A method according to claim 37, comprising generating addresses in the second range by modifying one or more selected bits in addresses generated by the host.

39. An apparatus according to claim 38, comprising generating addresses the second range by modifying one or more high-order bits in addresses generated by the host.

40. An apparatus according to claim 38, comprising applying the modified bits of addresses in the second range to the second memory controller but not to the memory.

41. A method of operating an ISDN network interface card (NIC) of the type that has a communications processor and a memory, the method comprising:

A. responding to addresses generated by the communications processor to cause a memory to read or write data in a first mode, and B. responding to addresses generated by a host to which the NIC is coupled to cause the memory to read or write data in a second mode.

42. A method according to claim 41, wherein the first and second modes are memory access modes.

43. A method according to claim 41, wherein the first mode is a single-beat memory access mode and the second mode is a burst memory access mode.

44. A method according to claim 43, wherein the communications processor generates addresses in a first address range.

45. A method according to claim 44, comprising generating addresses in the second range from requests by the host.

46. A method according to claim 45, including the steps of executing step (A) using a first memory controller, and executing step (B) using a second memory controller.

47. A method according to claim 46, wherein the first memory controller, the second memory controller and the memory are disposed in the NIC.

48. A method according to claim 47, comprising generating addresses in the second range by modifying one or more selected bits in addresses generated by the host.

49. An apparatus according to claim 48, comprising generating addresses the second range by modifying one or more high-order bits in addresses generated by the host.

50. An apparatus according to claim 49, comprising applying the modified bits of addresses in the second range to the second memory controller but not to the memory.

* * * * *